(12) United States Patent
Majumdar et al.

(10) Patent No.: US 10,599,759 B2
(45) Date of Patent: Mar. 24, 2020

(54) CONTENT SHARING WEB PAGE OVERLAY SYSTEM

(71) Applicant: INTERNATIONAL BUSINESS MACHINES CORPORATION, Armonk, NY (US)

(72) Inventors: Gautam Majumdar, Wappingers Falls, NY (US); Michael Q. Wang, Irving, TX (US); Fumiyoshi Yamada, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 15/487,484

(22) Filed: Apr. 14, 2017

(65) Prior Publication Data

US 2017/0220539 A1 Aug. 3, 2017

Related U.S. Application Data

(63) Continuation of application No. 14/246,581, filed on Apr. 7, 2014, now Pat. No. 9,658,995.

(51) Int. Cl.
| | | |
|---|---|---|
| *G06F 3/048* | (2013.01) |
| *G06F 17/24* | (2006.01) |
| *H04L 29/08* | (2006.01) |
| *G06F 16/958* | (2019.01) |
| *G06F 16/957* | (2019.01) |
| *G06Q 10/00* | (2012.01) |
| *G06F 17/22* | (2006.01) |
| *G06Q 30/02* | (2012.01) |

(52) U.S. Cl.
CPC ........ *G06F 17/241* (2013.01); *G06F 16/9577* (2019.01); *G06F 16/986* (2019.01); *G06F 17/2247* (2013.01); *G06F 17/24* (2013.01); *G06Q 10/00* (2013.01); *G06Q 30/0277* (2013.01); *H04L 67/02* (2013.01)

(58) Field of Classification Search
CPC combination set(s) only.
See application file for complete search history.

(56) References Cited

U.S. PATENT DOCUMENTS

| | | |
|---|---|---|
| 9,383,888 B2 | 7/2016 | Fish et al. |
| 2005/0114475 A1 | 5/2005 | Chang et al. |
| 2008/0005235 A1 | 1/2008 | Hegde et al. |
| 2009/0024930 A1* | 1/2009 | Kim ............... G06F 3/0484 715/744 |

(Continued)

OTHER PUBLICATIONS

"List of IBM Patents or Patent Applications Treated as Related" 1 page.

*Primary Examiner* — Pei Yong Weng
(74) *Attorney, Agent, or Firm* — William H. Hartwell; Andrew M. Calderon; Roberts Mlotkowski Safran Cole & Calderon, P.C.

(57) ABSTRACT

An approach for sharing information. The approach includes a method that includes generating, by at least one computing device, a message within a communication layer overlaid on a web page. The method further includes generating a screen shot of the web page. The method further includes sending the screen shot and the message to another user as a memo configured to be displayed on the communication layer overlaid on the web page on a receiving computing device.

16 Claims, 6 Drawing Sheets

(56) References Cited

U.S. PATENT DOCUMENTS

| | | |
|---|---|---|
| 2009/0198775 A1 | 8/2009 | Keinan et al. |
| 2009/0217196 A1 | 8/2009 | Neff et al. |
| 2009/0260060 A1* | 10/2009 | Smith .................... G06Q 10/10 726/3 |
| 2010/0095198 A1 | 4/2010 | Bultrowicz et al. |
| 2014/0019854 A1 | 1/2014 | Alexander et al. |
| 2015/0032686 A1 | 1/2015 | Kuchoor |
| 2015/0286622 A1 | 10/2015 | Majumdar et al. |

\* cited by examiner

Communication Summary

| Webpage link | Level | Your Team | Other Systems | System Information |
|---|---|---|---|---|
| ABC Application Search >>Go to the page | • Development Team-1 | 📄 Date/time XXXXXX 📄 Date/time XXXXXX 📄 Date/time XXXXXX | 📄 Date/time XXXXXX 📄 Date/time XXXXXX 📄 Date/time XXXXXX | 🔘 ABC Dev Team 🔘 ABC Test Team |
| ABC Application Search >>Go to the page | Testing Team-1 | | | |
| ABC Application Search >>Go to the page | Application Owner Team-1 | | | |

600, 602, 604, 606, 608, 610, 612 — Search

FIG. 6

CONTENT SHARING WEB PAGE OVERLAY SYSTEM

TECHNICAL FIELD

The present invention generally relates to sharing information, and more particularly, to a method and system for sharing communications while viewing web-based content at the same time.

BACKGROUND

Web pages are developed and can be created and updated by multiple members of a web development team, based on promotional needs, improvements for the user experience, and internal organizational needs. To improve the quality of the web page, the web development team can send information about the web page to reviewers and even end-users of the web page for review. The review process can include suggestions about web page content, e.g., images, colors, language, etc. Once a review is completed, the reviewers can send an email, for example, to the web development team that describes the reviewer's recommendations and ideas about the web page. Thus, the web development team can receive the reviews, make changes to the web pages, and send the updated web page information back to the reviewers, thereby initiating a continuous review and improvement process of the web page.

SUMMARY

In a first aspect of the invention, a method includes generating, by at least one computing device, a message within a communication layer overlaid on a web page. The method further includes generating a screen shot of the web page. The method further includes sending the screen shot and the message to another user as a memo configured to be displayed on the communication layer overlaid on the web page on a receiving computing device.

In another of the invention, there is a computer program product for sharing messages. The computer program product includes a computer usable storage medium having program code embodied in the storage medium. The program code is readable/executable by a computing device to receive a first user identifier, a second user identifier, and authorization from a user to allow at least one memo to be shared between a first user, associated with the first user identifier, and a second user associated with the second user identifier. The computer program product includes receiving, by the computing device, from the first user, a first memo comprising a text message and a screen shot of a web page. The computer program product includes sending, by the computing device, the first memo to the second user based on the authorization. The computer program product includes receiving, by the computing device, a second memo from the second user as a response to the first memo. The computer program product includes sending, by the computing device, the second memo to the first user base on the authorization. The first memo and the second memo are displayed on a transparent communication layer displayed over a web page on the first user's device.

In a further aspect of the invention, there is a system including a CPU, a computer readable memory and a computer readable storage medium. Additionally, the system includes one or more program instructions. Program instructions are operable to receive one or more identifiers and authorization to allow at least one memo to be shared between selected users. Program instructions are operable to receive a first memo and a first screen shot of a web page from an authorized first user. Program instructions are operable to send the first memo and the first screen shot to a second user based on the authorization. Program instructions are operable to receive a second memo and a second screen shot from the second user. Program instructions are operable to send the second memo and the second screen shot to the authorized first user. The first memo, the second memo, the first screen shot, and the second screen shot are displayed at the same time on a transparent communication layer on the authorized first user's device. The program instructions are stored on the computer readable storage medium for execution by the CPU via the computer readable memory.

In another aspect of the invention, a method for deploying a system for content sharing in a networked computing environment comprises providing a computer infrastructure being operable to: generate, by at least one computing device, a message within a communication layer overlaid on a web page; generate a screen shot of the web page; and send the screen shot and the message to another user as a memo configured to be displayed on the communication layer overlaid on the web page on a receiving computing device.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 6-7 show example displays in accordance with aspects of the present invention.

DETAILED DESCRIPTION

Figure 1:
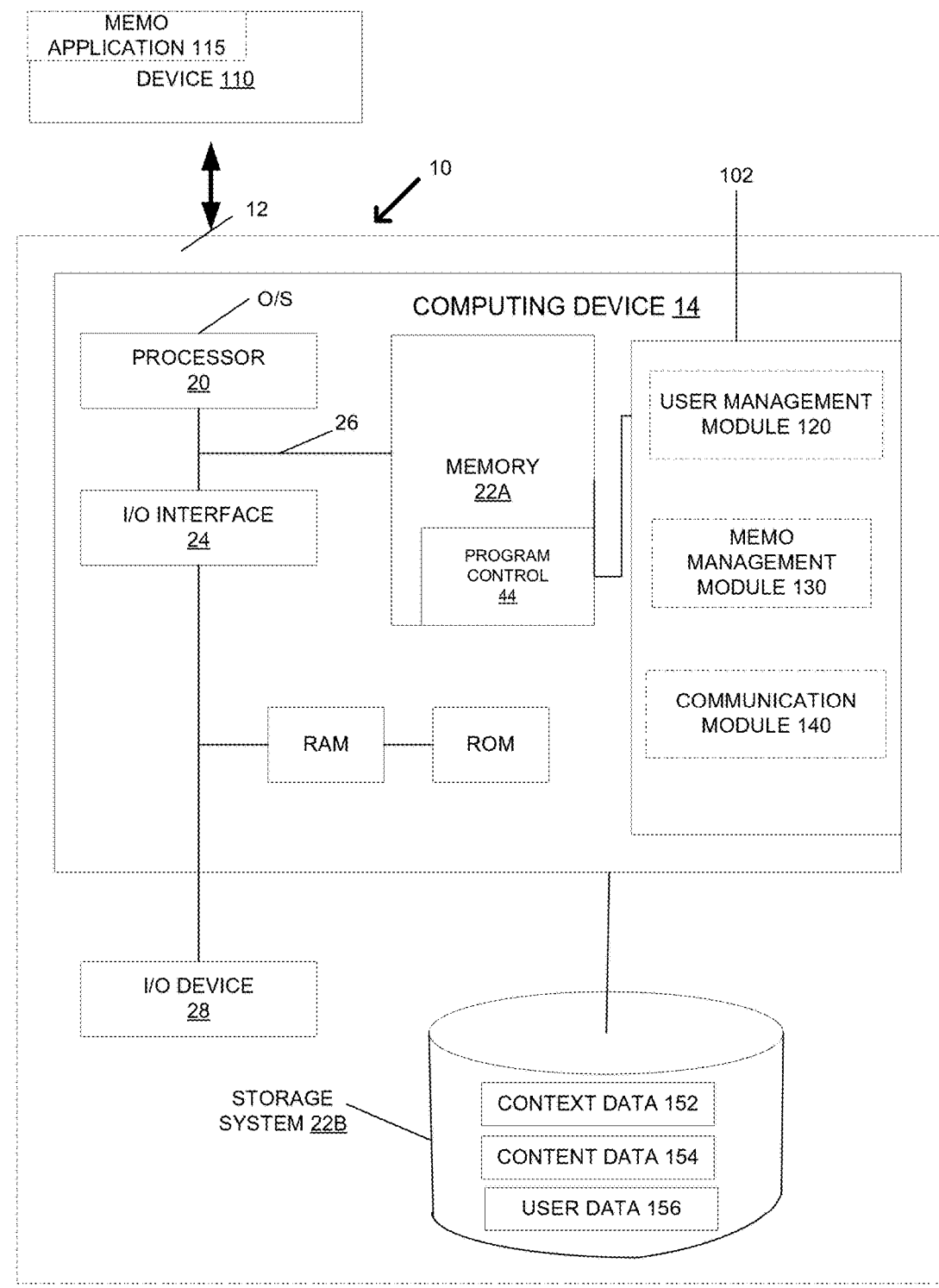
FIG. 1 is an example environment for implementing the steps in accordance with aspects of the present invention.

The present invention generally relates to sharing information, and more particularly, to a method and system for sharing communications while viewing web-based content at the same time. In embodiments, the present inventions overcomes conventional methods of sharing web page content for review by creating a communication layer over a web page that allows for web page developers and reviewers to interact within the communication layer. Not only are the web page developers and reviewers able to view each other's comments, messages, memos, etc., on the same interface, but they can also view stored screen shots, including past messages within the transparent communication layer. As such, the web page developers can receive comments and reviews in less time without having to: (i) send a message (e.g., email) to another account; (ii) wait for a reply; and (iii) open their own account to view the message. Instead, the web page developers can receive comments and provide updates within one transparent communication layer that allows for an interactive review process that requires less time and resources than conventional communication methods. Also, advantageously, the personal interaction allows the web page developers as well as the reviewers to review each other's comments in context of the screen shot, i.e., while also viewing the web page. This allows for placing the comments in context of the actual web page which is being commented upon.

Accordingly, the present invention allows for: (i) downloading a sharing application for use in a web page browser; (ii) web page developers and reviewers to enter comments, web page screen shots, etc., into a transparent communication display layer that is layered over a web page; (iii) creating a group that includes authorized developers and reviewers who only can view each other's comments, memos, web page screen shots, etc.; (iv) a sharing server to share comments between multiple computing devices so that comments within a transparent communication layer on one computing device is also visible on transparent communications layers on other computing devices associated with the group; and (v) a sharing server to store historical comments, memos, web page screen shots, etc., which can be viewed by any developer or reviewer who is an authorized member of a group.

Thus, the present invention ensures that web page developers and reviewers can synchronize, in real-time, screen shoots, comments, memos, messages, content, and/or other information from multiple users onto one transparent communication layer. Furthermore, the present invention ensures that the web page developers and reviewers can view past comments, memos, screen shots, etc., on the same transparent communication layer. As such, a single transparent communication layer can be used to provide communications between multiple users. While the present invention describes the communication layer as a transparent communication layer, the transparent communication layer can also be described as a plugin, a web user interface, and/or any other type of communication interface/application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes server 12, or other computing system. In particular, server 12 includes a computing device 14. The computing device 14 can be resident on a network infrastructure or computing device of a third party service provider (any of which is generally represented in FIG. 1). In embodiments, device 110 can communicate with the server 12 and provide displays and communications in accordance with aspects of the present invention. The device 110 can be a laptop, desktop computer, smart phone, tablet, and/or any other computing device capable of viewing web page content and/or receiving and sending web page content, textual messages, and/or other types of information from other devices.

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard, etc.

In general, processor 20 executes computer program code (e.g., program control 44), which can be stored in memory 22A and/or storage system 22B. Moreover, in accordance with aspects of the invention, program control 44 controls a sharing engine 102 e.g., the processes described herein. Sharing engine 102 can be implemented as one or more program code in program control 44 stored in memory 22A as separate or combined modules. Additionally, sharing engine 102 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, device 110 stores memo application 115. Memo application 115 is operable and designed to generate a transparent communication layer that can be layered over a web page or other types of content. In this way, a user of device 110 can enter text, screen shots, graphics, etc., using the transparent communication layer and send the information to another user who is also using a transparent communication layer on their device. The communication will be sent as an overlay on an existing webpage (including its content, e.g., graphics, layout, etc.). The other user (receiving user) can then view the sent information on other devices using memo application 115. That is, the receiving user will be able to receive the communication as an overlay of the web page, including the graphics, layout, etc. This allows both parties to communicate with one another, while viewing a snapshot of a web page. In embodiments, the communication can be a memo, e.g., a message that includes text, graphics, screen shots, shapes, and/or any other type of content that can be sent and viewed between devices. Advantageously, this places the communication concerning, for example, the design of the web page in context with the actual web page. That is, the communication about the web page can easily and transparently be viewed with the web page at the same time.

In embodiments, the transparent communication layer can be based on cascading style sheet (CSS) layer technology, hypertext markup language (HTML), hypertext processor (PHP) language, and/or any other type of layer language that can use different communication protocols (e.g., HTTP) with different types of languages (e.g., JavaScript, DB2, etc.). In embodiments, device 110 can send/receive HTTP messages, SMS messages, MMS messages, and/or using any other type of communication protocol to send messages.

In embodiments, sharing engine 102 includes user management module 120, memo management module 130, and communication module 140. In an example use, sharing engine 102 receives web page information and messages, and based on stored preferences regarding sharing of information, sharing engine 102 sends the web page information and messages to other devices. In this way, the information can be viewed by both the sending party and the receiving party using the same communication interface, but on different devices. In embodiments, the user management module 120, memo management module 130, and communication module 140 use context data 152, content data 154, and user data 156, stored in storage device 22B.

In embodiments, context data 152 can include information relating to a particular set of messages relating to web page content. Additionally, or alternatively, context data 152 can store context identification (ID) for a set of messages. For example, messages between developers and reviewers for web page "XYZ.com" may be a given an ID, such as "XYZ2014." Additionally, or alternatively, context data 152 can include URL information regarding a web page associated with a particular context ID. For example, context ID LRU122 can be associated with the URL "LRU.com." Additionally, or alternatively, context data 152 can include sharing information. In embodiments, sharing information indicates which users (e.g., developers, reviewers, end-users, etc.) can share and view web page information relating to a particular context ID.

In embodiments, content data 154 can include information relating to the content provided within shared messages. In embodiments, content data 154 can store context ID which allows content data to relate context information from context data 152 with information in content data 154. In further embodiments, content data 154 can store a comment ID, which provides an identifier to one or more comments associated with a context ID. For example, the comment ID can be associated with a single message sent between two users or associated with multiple messages sent between two users. In embodiments, content data 154 can store user ID information regarding different users that share messages. The user ID information allows content data 154 to relate which users are associated with the content data and also which users are associated with a context ID.

In embodiments, content data 154 can include timestamp information relating to the time that a message was initiated by a user, along with when a web page screen shot was taken. For example, if a user sends a message using their transparent communication layer at 2:03 p.m., then at that time a screen shot is also taken of the web page layered below the transparent communication layer. Thus, content data 154 receives the timestamp of when the web page screen shot and the message are created. In embodiments, content data can include layer ID information, e.g., an identifier for a transparent communication layer stored on device 110. Content data 154 can be used to determine which device 110 is providing the messages by using the layer ID. In this way, the layer ID can be used to ensure that memos are sent from, or received by, devices 110 that are associated with authorized users.

In embodiments, content data 154 can also include content. The content can be any kind of web page content, such as text, colors, images, graphical designs, photos, etc., that make up the design of the web page. In embodiments, content data 154 can also include the web page content that occurred at an instance in time, which is stored in storage 22B, i.e., a screen shot, which may be related to the content ID.

In embodiments, user data 156 is information relating to developers, reviewers, and end-users who are members of one or more groups of users. User data 156 can include, for example, a user ID identifying each user. This can include the user's name and/or the user's organizational affiliation (e.g., member of testing team, development team, operations team, etc.). More specifically, user data 156 includes: (i) identifier information for a user, such as user name; (ii) password information for a user; (iii) the type of user—a web page developer or reviewer; (iv) the authorization level of the user, e.g., the administrator for a group, a member of the group, etc.; (v) authorization level of how much historical information can viewed; (vi) preferences and rules to determine which messages can be sent to particular members of a group (e.g., messages during a particular time of day, day, etc., are only sent to select members, messages with particular text or screen shot information are only sent to select members, etc.); and/or (vii) any other type of user information.

The user information can be in combination with context data 152 and content data 154 or any combination thereof. In this way, it is possible to relate user ID to different content IDs and context IDs, thereby creating relationships between different information which can be used by user management module 120, memo management module 130, and/or communication module 140 to synchronously share memos and web page screen shots between multiple users.

In embodiments, user management module 120 allows for the creation of user accounts and groups, for use with the transparent communication layer. For example, user management module 120 can use identifier information from user data 156. Thus, user management module 120 can receive a message from a transparent communication layer from one device 110, and based on user group information, determine which other devices 110 are to receive the message. For example, device 110 sends a message "Hello" and also a screen shot of a web page to computing device 14. User management module 120 can determine, based on requested identifier information (e.g., user name) from user data 156, that device 110 is part of the "XYZ" group and that this group has two other devices 110. Thus, user management module 120 sends the message and screen shot to two other devices 110, which are part of the "XYZ" group. In a further example, user management module 120 can also use saved preferences that will permit only one of the two devices 110 to receive a message and/or a subsequent message thread.

In embodiments, memo management module 130 can update (e.g., edit, delete, etc.) stored messages in sharing engine 102, share messages between different devices 110, and/or provide notifications to users. For example, memo management module 130 receives a request from device 110 to implement an action which may be a stored message in storage system 22B. More specifically, a user of device 110 may have written a memo and would like to share that memo with another user. In this scenario, the memo from device 110 is sent to memo management module 130. In turn, memo management module 130 receives the message along with the web page screen shot, stores the message and the web page screen shot in storage system 22B, and, based on stored preferences and rules, sends the message to the other device 110. The other device 110 can view the message on its transparent communication layer, thereby allowing another user to view the message and also reply to the message.

In embodiments, memo management module 130 can also receive requests to update messages stored in storage system 22B. For example, memo management module 130 can receive a request from device 110 to update (e.g., correct a spelling mistake) a previously sent memo to another device 110. In embodiments, memo management module 130 may interact with user management module 120 to determine whether the request is from a user permitted to make such updates. Furthermore, if the update request is made during an active communication session between two devices 110, memo management module 130 can send the update to the other device 110. Thus, the user of the other device 110 will receive the updated message.

In embodiments, memo management module 130 can also receive a request to delete previously sent messages that are stored by storage system 22B. For example, upon receiving a request by an authorized user to delete a message, memo management module 130 can send a message to user data 156 to delete the message. In embodiments, memo management module 130 can also determine, based on interacting with user management module 120, whether the user has authorization to delete messages. Furthermore, if the update request is made during an active communication session between two devices 110, memo management module 130 can send a delete command to the other device 110. Thus, the message will also be deleted from the other device's display.

In embodiments, memo management module 130 can also generate notifications regarding updates to stored messages. In embodiments, when a message is updated, and/or deleted, memo management module 130 can send a notification to other devices 110 regarding the update, deletion, etc. In embodiments, the notification can be sent to the transparent communication layer on each device 110, as well as via text messages, emails, SMS messages, etc., to each device 110 based on user preferences stored in user data 156. In embodiments, memo management module 130 can also send notifications upon other events, e.g., new memo being created and sent to another user, new users entering the communication session, etc.

In embodiments, communication module 140 generates message threads that can be displayed on multiple transparent communication layers. This allows different comments to be arranged in a particular order within a message thread. In embodiments, the order of the different comments can be arranged by time, level of urgency (e.g., tagged by a user to be urgent), and/or any other method of arranging comments, in context with a screenshot at a particular time.

Figure 2:
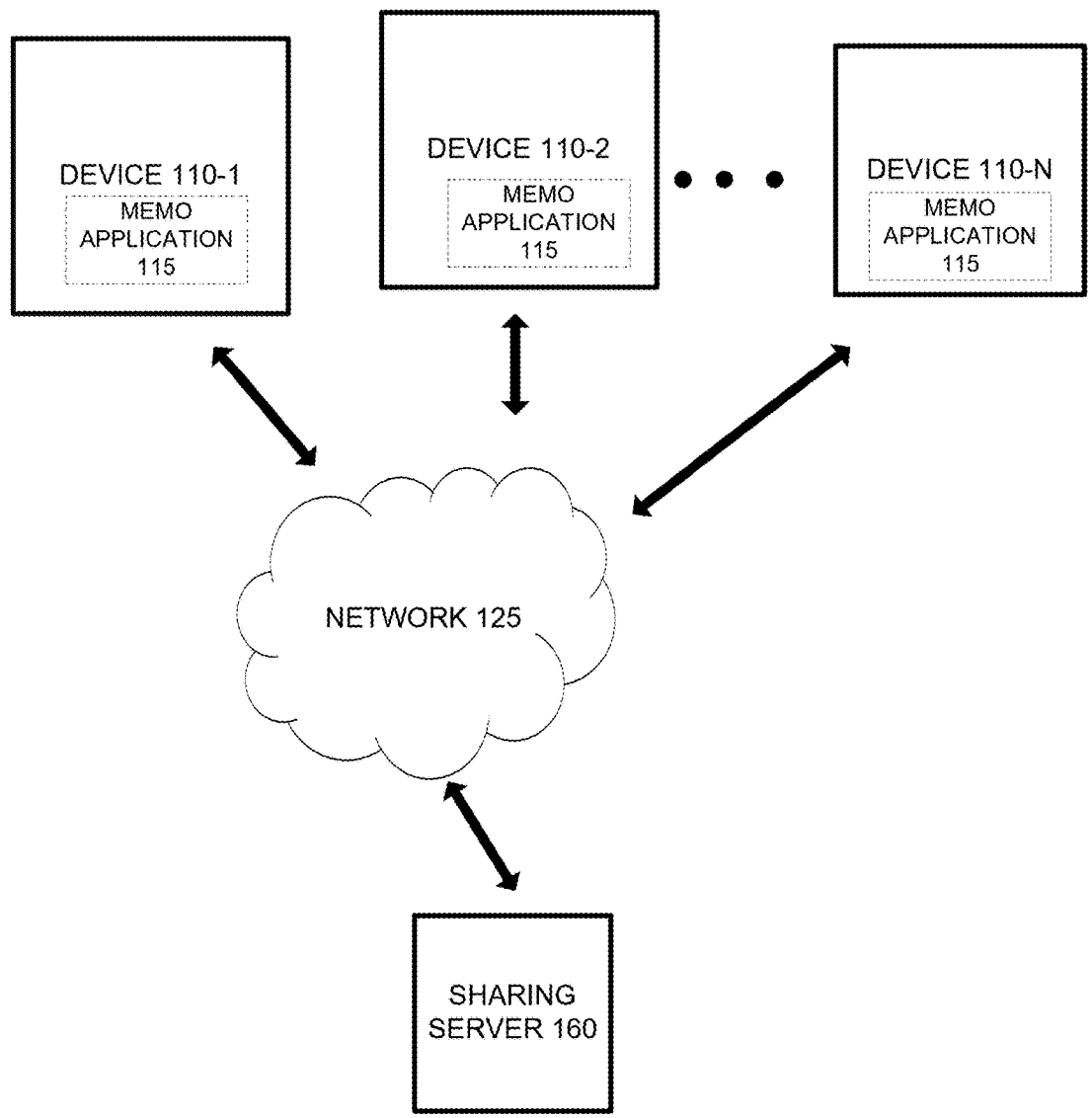
FIG. 2 is an example network diagram in accordance with aspect of the present invention.

FIG. 2 shows an example network diagram in accordance with aspects of the invention. FIG. 2 shows devices 110-1, 110-2, . . . , 110-N (hereinafter referred to device 110 in the singular and devices 110 in the plural), network 125, and sharing server 160. While FIG. 2 shows a particular quantity of each type of device and/or network, there may be additional or fewer devices, servers, and/or networks.

In this example, devices 110 may include any computation or communication device that is capable of communicating with a network (e.g., network 125). For example, devices 110 can be a laptop, desktop computer, smart phone, tablet, or any other type of computing device. Accordingly, devices 110 can receive and/or display content, which can include, for example, objects, data, images, audio, video, text, and/or links to files accessible via one or more networks. In embodiments, each device 110 can include memo application 115 which generates a transparent communication layer displayed as an overlay on web pages. Thus, memo application 115 allows for different users to send and receive screen shots and messages within the transparent communication layer, thereby allowing different users to see the sent/received screen shots and messages at the same time on different devices 110.

Network 125 may include one or more networks that allow for communication between different devices (e.g., devices 110, sharing server 160, etc.). In embodiments, network 125 can comprise an Internet, Intranet, local area network (LAN), wide area network (WAN), a GPS network, radio access network, a wireless fidelity (Wi-Fi) network, a Worldwide Interoperability for Microwave Access (Wi-MAX) network, a cellular network, and/or a combination of these or other networks.

Sharing server 160 can include one or more computational devices that can store messages and share the messages between different devices 110 based on whether devices 110 are registered and authorized to receive the messages. In embodiments, sharing server 160 can store modules and relationship databases that are used to share, update, and/or delete messages between different devices 110, as described in FIG. 1.

Figure 3:
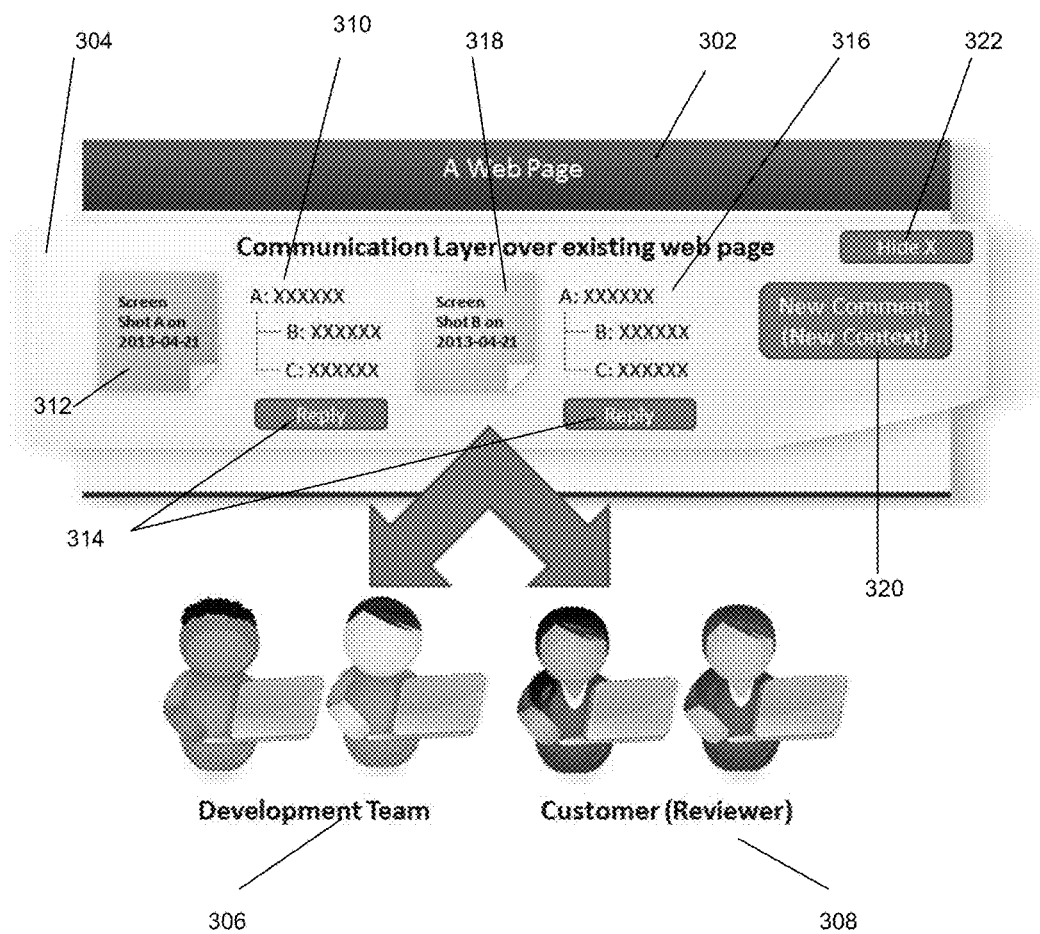
FIG. 3 is an example functional block diagram for sharing communications in accordance with aspects of the present invention.

FIG. 3 is an example functional block diagram for sharing communications in accordance with aspects of the present invention. As shown, FIG. 3 includes web page 302, transparent communication layer 304, development team 306, reviewer team 308, message thread 310, screen shot 312, reply button 314, message thread 316, screen shot 318, new comment 320, and hide selection 322.

In embodiments, web page 302 can be any web page that includes different types of text, images, graphics, and/or other types of content. In embodiments, web page 302 can be generated using JAVA, JAVAscript, HTML, and/or other types of languages. In embodiments, web page 302 can be associated with a particular URL address. In embodiments, transparent communication layer 304 can be a communication layer, e.g., page, overlay, etc., that is visually placed over web page 302. In this way, transparent communication layer 304 can send, receive and display communications from both development team 306 and reviewer team 308.

In embodiments, development team 306 can be one or more users that develop web page 302 and communicate using transparent communication layer 304. On the other hand, reviewer team 308 can be one or more users that review web page 302 designed by development team 306. Reviewer team 308 can communicate with the development team 306 using transparent communication layer 304. As shown in FIG. 3, both development team 306 and reviewer team 308 will have access to the same messages and information at the same time when they use transparent communication layer 304, as described herein.

In embodiments, message thread 310 provides one or more message threads of selected users, e.g., development team 306 and reviewer team 308. As shown in this example, message thread 310 shows A, B, and C, which represent user A, user B, and user C. For example, user A could be a member of development team 306; whereas users B and C are members of the reviewer team 308. Upon entering a message and selecting reply button 314, transparent communication layer 304 can take screen shot 312 of the current state of web page 302. The screen shot 312 is then sent and displayed on transparent communication layer 304 associated with the most recent message on any participating user's display. In this way, the latest message will be provided in context with the latest revisions of the web pages.

In embodiments, screen shot 312 changes when the user who started message thread 310 enters a message. In alternate embodiments, screen shot 312 can also change each time a user within message thread 310 enters a new message. Thus, when user C enters a message (e.g., typing a message, providing voice/audio commands, etc.) upon selecting reply button 314, screen shot 312 will change to an updated screen shot of web page 302.

In embodiments, selecting screen shot 312 allows a user to view the screen shot as an image of the web page. In examples, selecting screen shot 312 can provide: (i) a larger image of the screen shot; (ii) playing of video (e.g., playing, rewinding, forwarding, etc.) embedded within the screen shot; (iii) playing of audio embedded within the screen shot; and/or (iv) any other selectable graphical and/or visual portion of the screen shot.

Message thread 316 can be started by any user who is a member of development team 306 or reviewer team 308 or other registered user. Similar to message thread 310, message thread 316, once initiated by a user, can include one or more messages which, when sent using reply button 314, results in screen shot 318 being taken of web page 302 and being displayed on devices used by development team 306 and reviewer team 308. For example, message thread 310 may be started by a developer on development team 306 and message thread 316 may be started by a reviewer on reviewer team 308. In this example, screen shot 312 could show a screen shot of updates being made by the developer and screen shot 318 can be updates provided by reviewer team 308. For example, reviewer team 308 can edit, e.g., highlight, etc., web page 302 on their devices, and send a message with these edits as screen shot 318 to development team 306. In embodiments, the edits and highlights shown in screen shot 318 can be exclusive to the screen shot and do not appear on web page 302 when viewed by development team 306 or other users when viewing web page 302 on other devices. The edits within the screen shot will be then visible on transparent communication layer 304 for review by development team 306. In embodiments, development team 306 and reviewer team 308 can embed video and/or audio information into any screen shot 312 and/or 318 to assist in the design of the web page.

In embodiments, new comment 320 is a selection button/icon that can be used to start a new message thread by users from either development team 306 or reviewer team 308 or other registered users. Once selected, a new message thread can be shown on transparent communication layer 304 along with message threads 310 and 316. In embodiments, hide selection 322 is a selection button/icon that can be used to hide transparent communication layer 304, resulting in either closing or minimizing transparent communication layer 304 on web page 302.

Flow Diagram

Figure 4:
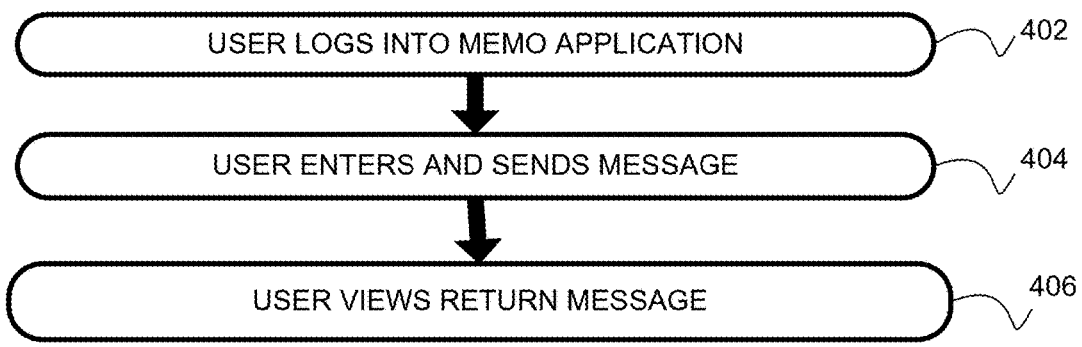
FIGS. 4-5 show example flows in accordance with aspects of the present invention.
Figure 5:
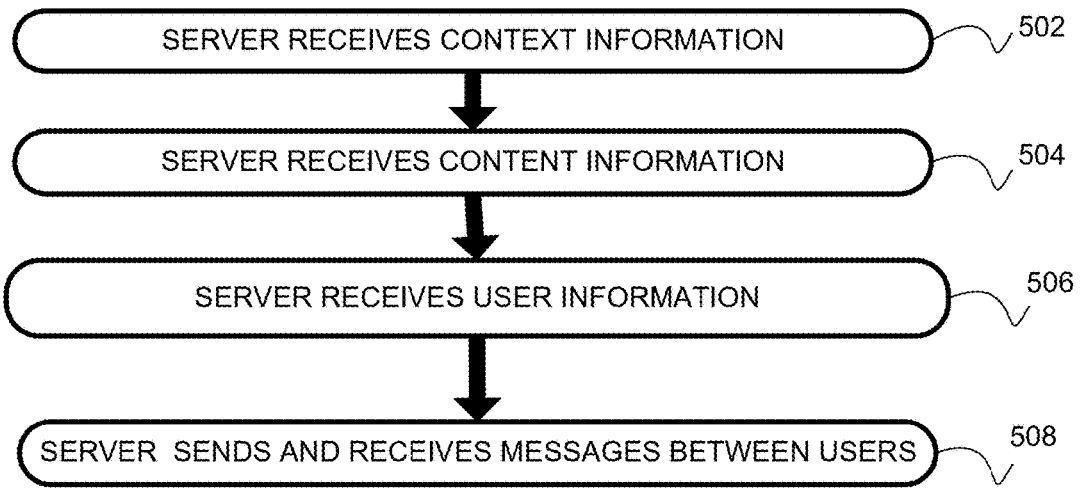

FIGS. 4 and 5 show exemplary flows for performing aspects of the present invention. The steps of FIGS. 4 and 5 may be implemented in the environment of FIGS. 1, 2, and/or 3, for example. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 4 depicts an exemplary flow for a user to share messages with other users in accordance with aspects of the present invention. At step 402, a user logs into a memo sharing application downloaded on their device. Upon logging into the memo sharing application, a transparent communication layer can be displayed on the device screen. At this time, or prior to logging into the memo sharing application, the user may also display a web page on the same device screen. In embodiments, the transparent communication layer can receive URL information about the web page either (i) automatically when the web page is displayed on the screen or (ii) by the user entering the URL information into the transparent communication layer.

In embodiments, the user may already be a member of a group that develops/reviews web page designs. For example, the user may be an administrator/manager of a group or the user may be a member of the group. Alternatively, the user can register to become a member of an existing group.

At step 404, the user creates a message. For example, the user enters a message into the transparent communication layer (e.g., "What do you think about gothic style text?"). Upon entering the message, the user can select a "send/reply" button/icon that results in a screen shot being taken of the currently displayed web page with, e.g., a URL stored by the transparent communication layer. In this way, the screen shot along with the message provided on the transparent communication layer can then be sent to other authorized/registered users.

At step 406, the user receives a reply message in response to the sent message. In embodiments, the reply message is shown on the transparent communication layer. Thus, the user can view the sent message, the reply message and the screen shot on the same interface at the same time.

FIG. 5 depicts an exemplary flow for a server to share messages between different users in accordance with aspects of the present invention. At step 502, the server receives user information. In embodiments, the user information can include user ID, user name, employer information (e.g., company, department, title, etc.), email address, phone number, work availability, etc. At step 504, the server receives content information. In embodiments, the content information can include web page content, web page screen shot information, timestamp information, messages, etc. At step 506, the server receives context information. In embodiments, the context information can include a web page URL, sharing information (e.g., which users can receive and share messages), and/or other information. In embodiments, the server uses the context information to generate context IDs, which identify and provide relationships between different messages and multiple users. At step 508, the server receives a request relating to a message. In embodiments, the request can be to send a message, update a message, delete a message, update screen shots, and/or notifying a user about a message being sent, updated, or deleted.

FIG. 6 shows an example display of a communication summary 600 in accordance with aspects of the present invention. In embodiments, communication summary 600 is a summary page generated by a server, showing a history of communications between registered users. Communication screen 608 provides the user the ability to view messages of different sessions, communications, etc. For example, communication summary 600 can be displayed on a user's device, such as a laptop, smart phone, etc., to provide a summary of communications, allowing the user to easily navigate through a history of messages and/or screen shots.

As shown in FIG. 6, communication summary 600 includes web page title 602, layer 604, your memo 606, other's memo 608, sharing information 610, and search 612. While communications summary 600 shows a particular number of columns and rows, communication summary 600 can include additional or fewer columns, and/or rows of other types of information.

In embodiments, web page title 602 displays tables of different web pages associated with different communications between developers, reviewers, and/or end-users. As shown, each block within web page title 602 includes a name of the web page (e.g., XYZ) and also a link ("go to the page") that, when selected, displays that particular web page on the user's device. Web page title 602 can be considered a project name since the same web page may be developed/reviewed by different teams. For example, one project may be XYZ123 for website XYZ.com and another project may be XYZ346 for different project.

In embodiments, layer 604 displays an identifier associated with a transparent communication layer that is or was being used by multiple users. For example, a transparent communication layer can be titled "Testing Team-1" which is being used by members of group authorized to use that particular communication layer. As discussed, the sharing server can store the identifier so that it can be used to determine which users are view memos (i.e., messages) and screen shots on their device.

In embodiments, your memo 606 displays messages sent by the user who requested communication summary 600. As shown, your memo 606 includes all the memos, their date and times, and also part of the message. In embodiments, the user can select a message (e.g., selecting the icon) and view the entire message or message threads. Also, each message can have an icon or graphic that is associated with the user. Additionally, each message has a "edit" selection which allows the user to change the message (e.g., update, delete, etc.).

In embodiments, other's memo 608 is a column that displays messages sent by other users who are associated with web page title 602. As shown, other's memo 608 includes all other user's memos, their date and times, and also a part of the message. Each message in other's memo 608 can also include an icon or graphic that is associated with the other user. In embodiments, the user can select one of these messages and view the entirety of the message.

In embodiments, sharing information 610 includes information about different users and/or teams of users who are authorized to use the layer described in layer 604. For example, as shown in FIG. 6, "Development Team-1" layer can be shared with "ABC Dev Team" and "ABC Test Team:" and the sharing server may store user IDs who are associated with these particular teams. Thus, the user requesting communication summary 600 can confirm and/or change which teams and/or particular users are allowed to use a particular layer as described in layer 604.

In embodiments, search 612 allows the user who requested communication summary 600 to search for particular information. For example, the user could enter a user's name and be provided with all messages generated by the user. Additionally, or alternatively, the user could enter a web page URL and be provided with all the communications associated with that web page. Additionally, or alternatively, the user can enter in multiple search terms to review, such as both a user name along with a web page, to receive a granular level of search results.

Figure 7:
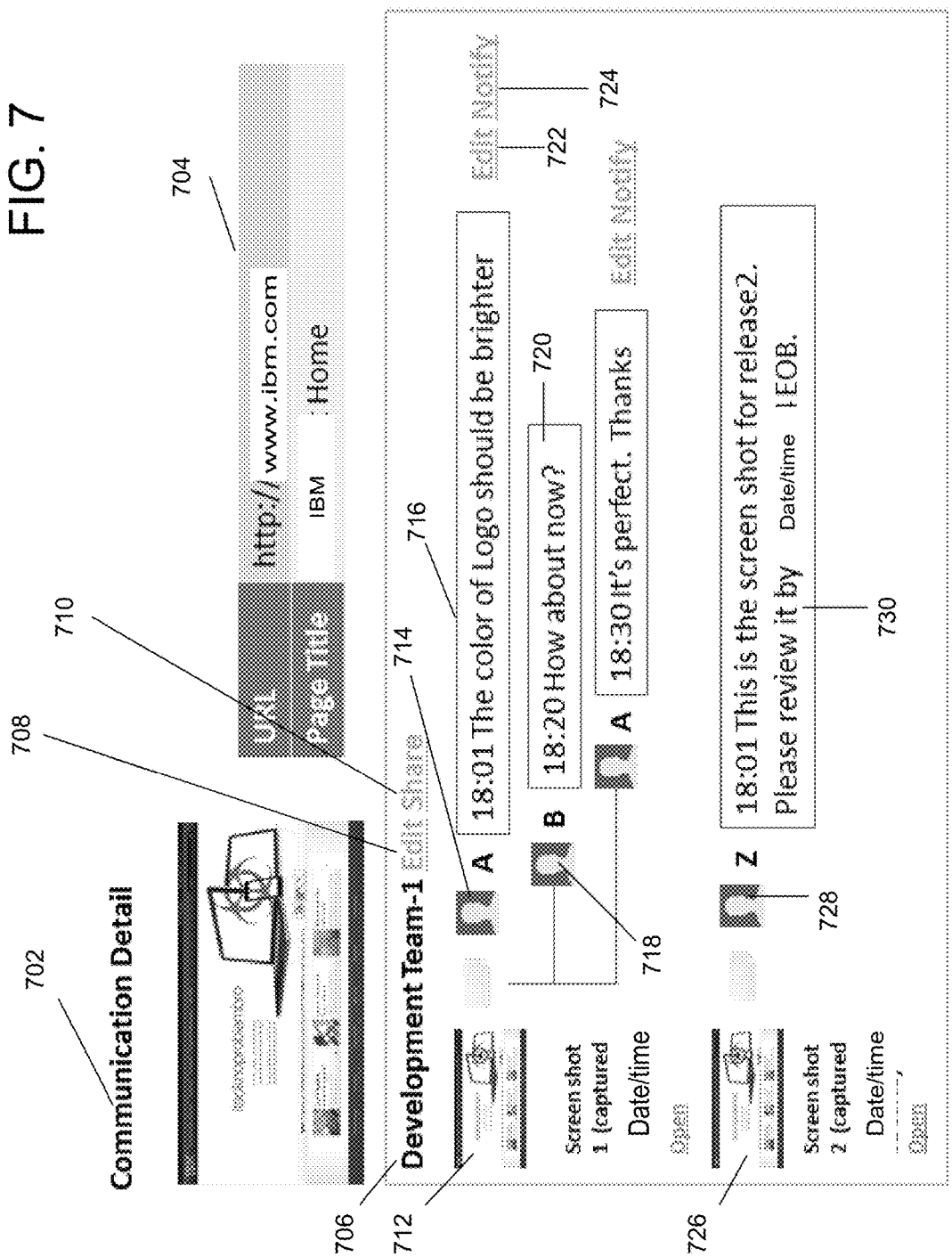

FIG. 7 shows an example display of a historical communication detail 702 in accordance with aspects of the present invention. In embodiments, communication detail 702 can be displayed to a user who selected a particular communication from communication summary 600. As shown, communication detail 702 includes web page information 704, team information 706, edit 708, share 710, screen shot 712, user identifier 714, message 716, user identifier 718, message 720, edit 722, notify 724, screen shot 726, user 728, message 730.

In embodiments, web page information 704 describes a web page URL and also a title for that particular web page (e.g., home page, login page, etc.). In embodiments, communication detail 702 can include team information 706 which can be edited (e.g., changing the users within the team) by using edit 708 and/or sharing the information within communication detail 702 with other users who may not be members of the team. In embodiments, screen shot 712 shows a screen shot taken at a particular date and/or time, allowing the ability to select a larger display of the screen shot. In embodiments, user identifier 714 describes a user who had entered message 716. In embodiments, message 716 includes a message, including, e.g., the time that the message was sent. In response to message 716, communication detail 702 can include user identifier 718, identifying a user who had entered message 720 at a later time. In embodiments, message 716 can be edited by using edit 722. For example, edit 722 allows an authorized user to either update, delete, and/or change a message that was generated by the authorized user. In embodiments, the user can also use notify 724 to notify other users regarding a particular message. For example, selecting notify 724 can results in a pop-up message screen that allows a message to be sent to other users on other communication platforms (e.g., email, SMS, etc.).

Communication detail 702 can also include screen shot 726 which is another screen shot of the web page described in web page 702. Additionally, communication detail 702 can also display message 730 created by user 728, which includes a message and a timestamp for that message.

In embodiments, the invention provides a method that performs the process of the invention on a subscription, advertising, and/or fee basis. That is, a service provider, such as a Solution Integrator, could offer to provide sharing information functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for sharing information. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   generating, by at least one computing device, a message from a user within a transparent layer overlaid on a web page;
   generating a screen shot of the web page;
   sending the screen shot and the message to another user as a memo configured to be displayed on the transparent layer overlaid on the web page on a receiving computing device;
   displaying the transparent layer in response to the user logging into the at least one computing device, and the transparent layer automatically receiving URL information when the web page is displayed;
   determining that the message is updated; and
   sending a notification to the another user, through the transparent layer and a text message of a device of the another user, that the message has been updated,
   wherein the transparent layer generates the screen shot of the web page and which incorporates cascading style sheet (CSS) technology, and
   the URL information indicates at least one user which is permitted to share and view information about the web page.

2. The method of claim 1, further comprising:
   receiving a reply message and a memo that includes another screen shot different from the screen shot of the web page;
   selecting the another screen shot;
   increasing a size of the another screen shot;
   playing a video embedded within the another screen shot;
   playing audio embedded within the another screen shot; and
   displaying the increased size screen shot on the at least one computing device.

3. The method of claim 1, wherein the screen shot includes a timestamp that indicates when the screen shot of the web page was taken and a timestamp that indicates when the message is generated.

4. The method of claim 1, wherein the sending of the message include sending the message to authorized members of a group based on preferences of an authorized user, wherein the preferences include user identifiers for the authorized members of the group.

5. The method of claim 4, wherein the preferences include:
   a period of time that allows at least one member of the group to send or receive messages; and
   an authorization that allows at least one member of the group to view historical messages.

6. The method of claim 1, wherein the message includes selectable video and audio portions for playing on the at least one computing device by an authorized user associated with a user identifier that is confirmed by a server prior to the authorized user receiving the message.

7. The method of claim 1, further comprising:
   displaying a history of previous screen shots and messages from a plurality of users,
   wherein the displaying the history of previous screen shots and messages is provided on the transparent layer laid over the web page.

8. The method of claim 1, wherein the screen shot of the web page changes with revisions made to the web page each time a user sends a new message from the at least one computing device.

9. The method of claim 8, wherein the revised screen shot is sent with a message to another user's device.

10. The method of claim 1, further comprising minimizing the transparent layer in response to a request to hide the transparent layer.

11. A computer program product for sharing messages, the computer program product comprising a computer readable storage medium having program instructions embodied therewith, the program instructions readable/executable by a computing device to cause the computing device to:
    receive, by the computing device, a first user identifier, a second user identifier, and authorization from a user to allow at least one memo to be shared between a first user, associated with the first user identifier, and a second user associated with the second user identifier;
    receive, by the computing device, from the first user, a first memo comprising a text message and a screen shot of a web page;
    send, by the computing device, the first memo to the second user based on the authorization;
    receive, by the computing device, a second memo comprising another screen shot from the second user as a response to the first memo;
    send, by the computing device, the second memo to the first user based on the authorization, wherein the first memo and the second memo are displayed at different locations on a transparent layer displayed over a web page on the first user's device; and
    display, by the computing device, the transparent layer in response to a user logging into the computing device, and the transparent layer automatically receiving URL information when the web page is displayed
    determine, by the computing device, that the at least one memo is updated; and
    send, by the computing device, a notification to the second user that the at least one memo has been updated through the transparent layer and a text message of a device of the second user,
    wherein the transparent layer generates the screen shot of the web page and incorporates cascading style sheet (CSS) technology, and
    the URL information indicates at least one user which is permitted to share and view information about the web page.

12. The method of claim 1, further comprising:

storing a history of previous screen shots and messages from a plurality of users on a sharing server;

viewing the history of previous screen shots and messages from the plurality of users on the sharing server by an authorized member; and downloading a sharing application for a web page browser used for viewing the web page.

13. The method of claim 12, wherein the transparent layer is a web user interface which synchronizes in real-time a plurality of screen shots, comments, memos, the messages, and content.

14. The method of claim 13, wherein each of the plurality of screen shots include user identification information that relates which user is associated with the content provided in each of the plurality of screen shots, a comment identification which relates the content provided in each of the plurality of screen shots with context information from context data, content data which relates the context information from the context data with information in the content data, and layer identification information which includes an identifier for the transparent layer.

15. The method of claim 14, further comprising:

receiving a deletion request by the user;

determining whether the user is an authorized user;

deleting the message within the transparent layer in response to determining that the deletion request is sent by the authorized user; and preventing deletion of the message within the transparent layer in response to determining that the deletion request is sent by an unauthorized user.

16. The computer program product of claim 11, wherein the computing device further causes the computing device to:

store a history of previous screen shots and messages from a plurality of users on a sharing server;

view the history of previous screen shots and messages from the plurality of users on the sharing server by an authorized member;

download a sharing application for a web page browser used for viewing the web page;

receive a deletion request by the user;

determine whether the user is an authorized user;

delete the message within the transparent layer in response to determining that the deletion request is sent by the authorized user; and prevent deletion of the message within the transparent layer in response to determining that the deletion request is sent by an unauthorized user, wherein the transparent layer is a web user interface which synchronizes in real-time a plurality of screen shots, comments, memos, the messages, and content.

* * * * *